United States Patent
Kim et al.

(10) Patent No.: US 9,197,983 B2
(45) Date of Patent: Nov. 24, 2015

(54) METHOD FOR ALLOCATING A RANGING CHANNEL IN A WIRELESS COMMUNICATION SYSTEM AND BASE STATION FOR SAME

(75) Inventors: Jeongki Kim, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 14/131,186

(22) PCT Filed: Jul. 9, 2012

(86) PCT No.: PCT/KR2012/005415
§ 371 (c)(1),
(2), (4) Date: Jan. 6, 2014

(87) PCT Pub. No.: WO2013/006019
PCT Pub. Date: Jan. 10, 2013

(65) Prior Publication Data
US 2014/0192731 A1     Jul. 10, 2014

Related U.S. Application Data

(60) Provisional application No. 61/505,118, filed on Jul. 7, 2011, provisional application No. 61/505,519, filed on Jul. 7, 2011.

(51) Int. Cl.
| H04W 4/00 | (2009.01) |
| H04L 5/00 | (2006.01) |
| H04W 72/04 | (2009.01) |
| H04W 88/08 | (2009.01) |
| H04W 28/18 | (2009.01) |
| H04W 92/18 | (2009.01) |

(52) U.S. Cl.
CPC ............ *H04W 4/005* (2013.01); *H04L 5/0048* (2013.01); *H04L 5/0053* (2013.01); *H04W 28/18* (2013.01); *H04W 72/0453* (2013.01); *H04W 88/08* (2013.01); *H04L 5/0091* (2013.01); *H04W 92/18* (2013.01)

(58) Field of Classification Search
None
See application file for complete search history.

(56) References Cited

U.S. PATENT DOCUMENTS

2008/0316954 A1* 12/2008 Zheng ............................ 370/315
2010/0118772 A1* 5/2010 Cheng et al. .................. 370/328
(Continued)

OTHER PUBLICATIONS

IEEE C802.16p-11_0090r2; "M2M ranging channel indication using UL-MAP for M2M in 16e"; May 18, 2011; Honggang et al.*
(Continued)

*Primary Examiner* — Benjamin H Elliott, IV
(74) *Attorney, Agent, or Firm* — Lee, Hong, Degerman, Kang & Waimey (57) ABSTRACT

Disclosed is a method for allocating a ranging channel in a wireless communication system that supports machine to machine communication, and to a base station for same. More particularly, the method comprises the steps of: transmitting a message including a dedicated connection identifier (CID) dedicatedly allocated to a device that supports machine to machine communication; allocating a dedicated ranging area for transmission of a ranging request message to the device that supports machine to machine communication; and transmitting an uplink map (UL-MAP) message including information on the dedicated CID and the dedicated ranging area to the device that supports machine to machine communication.

14 Claims, 4 Drawing Sheets

(56) References Cited

U.S. PATENT DOCUMENTS

| | | | |
|---|---|---|---|
| 2010/0322142 A1* | 12/2010 | Kim et al. | 370/315 |
| 2012/0231828 A1* | 9/2012 | Wang et al. | 455/509 |
| 2014/0192731 A1* | 7/2014 | Kim et al. | 370/329 |

OTHER PUBLICATIONS

IEEE C802.16p-11/0095; "Proposed Text for Transmission of Dedicated Ranging Information and Signaling Support for M2M Devices"; May 8, 2011; LG Electronics.*

IEEE C802.16p-11/0120r1; "Dedicated Ranging Opportunity Assignment for M2M Group"; May 12, 2011; Lin et al.*

IEEE C802.16p-11/0175; "Clarification on the M2M dedicated ranging region allocated by UL-MAP IE in WirelessMAN-OFDMA"; Jul. 10, 2011; Kim et al.*

Li, et al., "M2M ranging channel indication using UL-MAP for M2M in 16e," IEEE 802.16 Broadband Wireless Access Working Group, IEEE C802.16p-11_0090r2, May 2011, 5 pages.

Kang, et al., "Considerations on resource allocation for M2M group," IEEE 802.16 Broadband Wireless Access Working Group, IEEE C802.16p-1010024, Dec. 2010, 5 pages.

Kim, et al., "Allocation of dedicated ranging channel for M2M devices," IEEE 802.16 Broadband Wireless Access Working Group, IEEE C802.16p-11/0081r1, May 2011, 5 pages.

Lin, et al., "Dedicated Ranging Opportunity Assignment for M2M Group," IEEE 802.16 Broadband Wireless Access Working Group, IEEE C80216p-11/0120r1, May 2011, 3 pages.

Kim, et al., "Clarification on the M2M dedicated ranging region allocated by UL-MAP IE in WirelessMAN-OFDMA," IEEE 802.16 Broadband Wireless Access Working Group, IEEE 802.16p-11/0175, Jul. 2011, 3 pages.

PCT International Application No. PCT/KR2012/005415, Written Opinion of the International Searching Authority dated Jan. 22, 2013, 18 pages.

* cited by examiner

METHOD FOR ALLOCATING A RANGING CHANNEL IN A WIRELESS COMMUNICATION SYSTEM AND BASE STATION FOR SAME

CROSS-REFERENCE TO RELATED APPLICATIONS

This application is the National Stage filing under 35 U.S.C. 371 of International Application No. PCT/KR2012/005415, filed on Jul. 9, 2012, which claims the benefit of U.S. Provisional Application Ser. Nos. 61/505,118, filed on Jul. 7, 2011, and 61/505,519, filed on Jul. 7, 2011, the contents of which are all hereby incorporated by reference herein in their entirety.

TECHNICAL FIELD

The present invention relates to a wireless communication system, and more particularly, to a method of assigning a ranging channel in a wireless communication system supporting machine to machine communication and apparatus therefor.

BACKGROUND ART

Generally, a machine-to-machine (hereinafter abbreviated M2M) communication literally means a communication between one electronic device and another electronic device. In a broad sense, the M2M communication may mean a wire/wireless communication between electronic devices or a communication between a human-controllable device and a machine. Recently, the M2M communication may generally indicate a communication between electronic devices, i.e., a device-to-device wireless communication performed without human involvement.

In the early 1990's, in which the concept of the M2M communication has been initially introduced, the M2M communication has been recognized as remote control or telematics or the like and derivative markets of the M2M communication were very limitative. Yet, the M2M communication has grown rapidly for past few years and has become the globally noteworthy markets. Specifically, in POS (point of sales) and security related application markets, the M2M communication has considerably influence on such field as fleet management, remote monitoring of machinery and equipment, smart meter for auto-measurement of operating time, consumed heat or electricity quantity on construction machinery equipment and the like. M2M communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of the M2M communication, every machine equipped with SIM (subscriber identity module) card enables data transmission and reception and is capable of remote management and control. For instance, as M2M communication technology is usable for numerous devices and equipment including vehicles, trucks, trains, containers, auto-vending machines, gas tanks and the like, its application fields may reach far and wide.

DISCLOSURE OF THE INVENTION

Technical Task

One object of the present invention is to provide a method of assigning a dedicated ranging channel to a device supporting machine to machine communication in a wireless communication system preferably supporting machine to machine communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of assigning a ranging channel in a wireless communication system supporting a machine to machine communication include the steps of transmitting a message including a dedicated connection identifier (CID) dedicatedly allocated to a device supporting the machine to machine communication, allocating a dedicated ranging region to the device supporting the machine to machine communication to transmit a ranging request message, and transmitting an uplink MAP (UL-MAP) message including information on the dedicated CID and the dedicated ranging region to the device supporting the machine to machine communication.

To further achieve these and other advantages and in accordance with the purpose of the present invention, according to a different embodiment, a base station assigning a ranging channel in a wireless communication system supporting a machine to machine communication includes an RF (radio frequency) unit configured to transceive a radio signal and a processor configured to transmit a message including a dedicated connection identifier (CID) dedicatedly allocated to a device supporting the machine to machine communication, the processor configured to allocate a dedicated ranging region to the device supporting the machine to machine communication to transmit a ranging request message, and the processor configured to transmit an uplink MAP (UL-MAP) message including information on the dedicated CID and the dedicated ranging region to the device supporting the machine to machine communication.

Preferably, the message including the dedicated CID corresponds to an uplink channel descriptor message or a downlink channel descriptor message.

Preferably, the message including the dedicated CID corresponds to a registration response message.

Preferably, the message including the dedicated CID corresponds to a de-registration response message.

Preferably, the message including the dedicated CID corresponds to a dynamic service addition request message or a dynamic service addition response message.

Preferably, the dedicated ranging region is differently allocated according to a group including one or more devices supporting the machine to machine communication.

Preferably, a message including a dedicated ranging region indicator is transmitted and the dedicated ranging region indicator indicates whether the device supporting the machine to machine communication uses a ranging region allocated by the UL-MAP message including a broadcast CID.

It is to be understood that both the foregoing general description and the following detailed description are exemplary and explanatory and are intended to provide further explanation of the invention as claimed.

Advantageous Effects

According to embodiments of the present invention, a dedicated ranging channel can be assigned to a device supporting machine to machine communication in a wireless communication system, preferably, in a wireless communication system supporting machine to machine communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a user equipment. In this case, the base station has a meaning of a terminal node of a network directly communicating with a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other network nodes except the base station. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

In the following description, an M2M communication may mean an information exchange performed between mobile stations or between a base station and each of mobile stations without human involvement. The M2M communication can be substituted with such a terminology as a D2D (device to device) communication, a P2P (peer to peer) communication, or the like. Hence, the M2M device may mean a mobile station capable of supporting the above-mentioned M2M device communication. An access service network for an M2M service may be defined as an M2M ASN (M2M access service network) and a network entity performing communications with M2M devices may be named an M2M server. In particular, the M2M server activates an M2M application and provides an M2M-specific service for one or more M2M devices. An M2M feature indicates a feature of an M2M application. And, at least one feature may be necessary to provide an application. An M2M device group may mean a group of M2M devices that share at least one common feature with each other.

The devices performing communications by M2M scheme may be variously named M2M devices, M2M communication devices, MTC (machine type communication) devices and the like. And, the number of the devices will increase gradually as the number of machine application types does in a prescribed network. The currently discussed machine application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related application market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types.

According to properties of M2M devices, the M2M device may have low mobility or no mobility. If a prescribed M2M device has considerably low mobility or does not have mobility at all, it may mean that the corresponding M2M device is stationary in the long term. An M2M communication system may be able to simplify or optimize mobility related operations for a specific M2M application related to such an M2M device having a stationary location as an M2M device for secured access and surveillance, an M2M device for public safety, an M2M device for payment, an M2M device for remote maintenance and control, an M2M device for metering and the like.

As mentioned in the foregoing description, as the number of machine application types increase, the number of M2M devices may considerably increase compared to the number of general mobile communication devices. Hence, if each of the M2M devices individually performs a communication with a base station, serious overhead may affect a wireless interface and a network.

In the following description, an embodiment of the present invention is explained with reference to a case of applying M2M communication to a wireless communication system (e.g., IEEE 802.16 system), by which the present invention may be non-limited. And, an embodiment of the present invention is applicable to such a different wireless communication system as 3GPP LTE system and the like in the same manner.

1. IEEE 802.16 System to which the Present Invention is Applicable

A physical layer of a broadband wireless access system is mainly classified into a single carrier scheme and a multi-carrier scheme (OFDM/OFDMA). The multi-carrier scheme uses OFDM. Meanwhile, as an access scheme capable of allocating a resource in a sub-channel unit, which is a result of grouping a part of a carrier, an OFDMA (orthogonal frequency division multiple access) scheme has been introduced.

Activated carriers are classified into groups in the OFDMA physical layer and the activated carriers are transmitted to receiving ends different from each other according to the groups. A group of carriers transmitted to a single receiving end is called a sub-channel. Carriers configuring each sub-channel may be adjacent to each other or may be apart from each other with an equal space. As mentioned in the foregoing description, by enabling multiple accesses to be performed in a sub-channel unit, it is able to efficiently perform a frequency diversity gain, a gain resulted from a concentration of power, and forward power control although complexity of implementation increases.

A slot allocated to each user is defined by a data region of 2 dimensional time-frequency space and this is a set of contiguous sub-channels assigned by a burst. In OFDMA, a data region is depicted as a rectangle determined by a time coordinate and a sub-channel coordinate. The data region is allocated to an uplink of a specific user. Or, a base station can transmit the data region to a specific user in downlink. In order to define the data region in a 2 dimensional space, it is necessary to have the number of OFDM symbols in time domain and the number of contiguous sub-channels starting at a position apart from a reference point as much as an offset in frequency domain.

Figure 1:
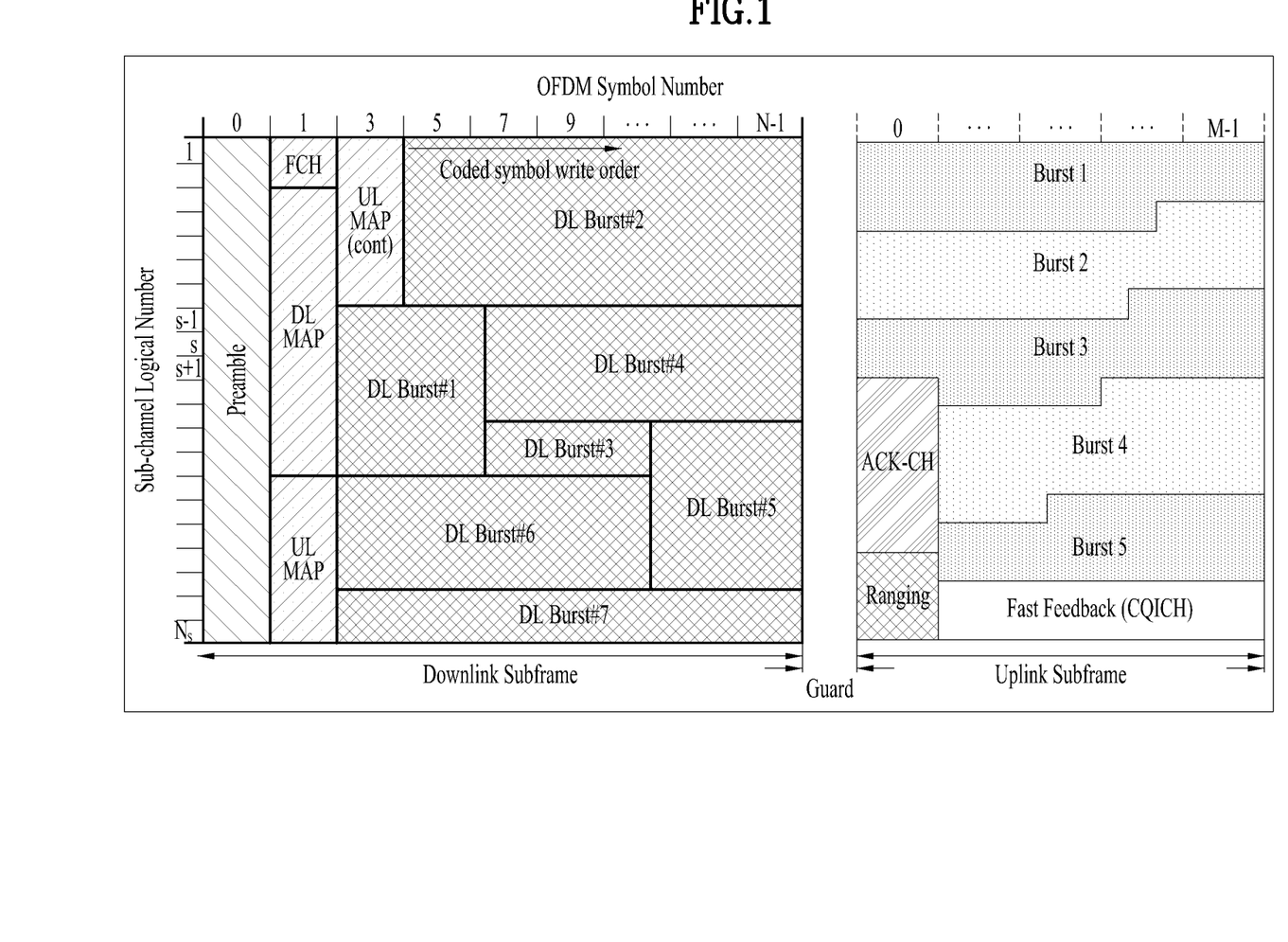
FIG. 1 is a diagram for an example of a frame structure of an OFDM physical layer in a broadband wireless access system.

FIG. 1 is a diagram for an example of a frame structure of an OFDM physical layer in a broadband wireless access system.

Referring to FIG. 1, a horizontal axis of a frame indicates an ODFMA (orthogonal frequency division multiple access) symbol as a time unit. A vertical axis of a frame indicates a logical number of a sub-channel as a frequency unit. In FIG. 1, one frame is classified into data sequence channels for a prescribed time interval due to a physical attribute. In particular, one frame consists of a downlink subframe and an uplink subframe. The downlink subframe and the uplink subframe are divided by a TTG (transmit transition gap) and frames are divided by an RTG (receive transition gap).

In this case, the downlink subframe can include a preamble, a frame control header (FCH), a downlink map (DL MAP), an uplink map (UL-MAP), and one or more data bursts. And, the uplink subframe can include one or more uplink (UL) data bursts and ranging sub-channels.

The preamble is a specific sequence data situating at a first symbol of every frame. A user equipment uses the preamble to synchronize with a base station or to estimate a channel. The FCH (frame control header) is used to provide channel assignment information related to the DL-MAP and information on a channel coding. The DL-MAP/UL-MAP is a media access control (MAC) message used to inform a user equipment of channel resource allocation in DL/UL. And, the data burst indicates a unit of data transmitted to a user equipment by a base station or transmitted to the base station by the user equipment. The user equipment synchronizes with the base station by detecting a preamble transmitted by the base station and decodes the DL-MAP using information obtained in the FCH. And, the base station can transmit scheduling information, which is necessary to allocate a DL or UL resource, to the user equipment using a DL-MAP message or an UL-MAP message (DL-MAP/UL-MAP) on every frame (e.g., 5 ms).

The DL-MAP message defines a purpose of a burst allocated to a DL interval according to the burst in a burst mode physical layer and the UL-MAP message defines a purpose of a burst allocated to a UL interval. Information element (IE), which forms the DL-MAP, classifies a DL traffic section in a user end according to a DIUC (downlink interval usage code), a CID (connection ID), and a location information (sub-channel offset, symbol offset, the number of sub-channels, the number of symbols) of a burst. Meanwhile, a purpose of an information element, which forms the UL-MAP, is determined by a UIUC (uplink interval usage code) according to each CID (connection ID) and a position of a corresponding interval is regulated by 'duration'. In this case, a purpose for each interval is determined by a UIUC value used in the UL-MAP and each interval starts at a position apart from a start point of a previous IE as much as 'duration' regulated by the UL-MAP IE.

As depicted in FIG. 1, in IEEE 802.16 system, a resource allocation for a UL burst is performed by a slot unit and resource allocation is preferentially performed from the top left to the right. If there is no available resource capable of being allocated to a corresponding row, i.e., a sub-channel, a resource is allocated to a next row from the left.

Meanwhile, in a process of performing an initial network registration procedure, a process of controlling a transmission parameter (frequency offset, time offset, and transmit power) for an UL communication with a base station controlled by a user equipment is called an initial ranging. After performing the network registration procedure, the user equipment performs a periodic ranging to consistently maintain the UL communication with the base station. Besides, as a type of ranging, a ranging includes a handover ranging configured to simplify a handover operation procedure of the user equipment and a bandwidth-request ranging performed in a process of requesting an UL band requested by the user equipment when a data to be transmitted occurs.

In a broadband wireless communication system, a CDMA code set capable of being used in case of performing a ranging and a region to which a CDMA code is transmitted are allocated by a network via a UL-MAP in accordance with each type of ranging. Hence, for instance, in order for a specific user equipment to perform a handover ranging, the specific user equipment should make a request for a ranging in a manner of selecting a specific code among CDMA codes for the handover ranging and transmitting the selected code to a network via an initial ranging and a handover ranging region. By doing so, the network can identify the type of ranging by the received CDMA code and the interval in which the CDMA code is transmitted.

In order for a user equipment to perform a ranging, the user equipment uses a ranging channel assigned by a UL-MAP IE received from a base station.

Table 1 indicates an OFDMA UL-MAP IE format.

using a new UL-MAP IE is proposed for 802.16e system-based M2M devices in Table 2 as follows.

Table 2 shows an example of extended UIUC code allocation.

TABLE 2

| Extended UIUC (hexadecimal) | Usage |
|---|---|
| 0x0 | Power Control IE |
| 0x1 | Reserved |
| 0x2 | AAS UL IE |
| 0x3 | CQICH Allocation IE |
| 0x4 | UL Zone IE |
| 0x5 | UL-MAP Physical Modifier IE |
| 0x6 | Reserved |
| 0x7 | UL-MAP Fast Tracking IE |
| 0x8 | UL PUSC Burst Allocation in Other Segment IE |
| 0x9 | Fast Ranging IE |
| 0xA | UL Allocation Start IE |
| 0xB | Dedicated Ranging Channel for M2M IE |
| 0xC . . . 0xF | Reserved |

TABLE 1

| Syntax | Size (bit) | Notes |
|---|---|---|
| UL-MAP_IE( ) { | — | — |
|   CID | 16 | — |
|   UIUC | 4 | — |
|   if (UIUC == 11) { | — | — |
|     Extended UIUC 2 dependent IE | variable | See 8.4.5.4.4.2 |
|   } | — | — |
|   else if (UIUC == 12) { | — | — |
|     OFDMA Symbol offset | 8 | — |
|     Subchannel offset | 7 | — |
|     No. OFDMA Symbols | 7 | — |
|     No. Subchannels | 7 | — |
|     Ranging Method | 2 | 0b00: Initial ranging/Handover Ranging over two symbols<br>0b01: Initial ranging/Handover Ranging over four symbols<br>0b10: BR/periodic ranging over one symbol<br>0b11: BR/periodic ranging over three symbols |
|     Dedicated ranging indicator | 1 | 0: The OFDMA region and ranging method defined are used for the purpose of normal ranging<br>1: The OFDMA region and ranging method defined are used for the purpose of ranging using dedicated CDMA code and transmission opportunities assigned in the MOB_PAG-ADV message, in the RNG-RSP message, or in the MOB_SCN-RSP message. |
|   } else if (UIUC == 13) { | — | — |
|     PAPR_Reduction_and_Safety_Zone_$_{Sounding}$ Zone Allocation_IE | 32 | — |

As shown in Table 1, in a legacy IEEE 802.16 system, a base station assigns a ranging channel in a manner of setting a broadcast CID and a UIUC value to 12 to enable all user equipments to see the broadcast CID and the UIUC value. A user equipment attempts a ranging using a ranging channel assigned by UL-MAP IE having the UIUC value of 12 as the broadcast CID.

2. Method of Assigning a Ranging Channel

Since there exist a plurality of M2M devices in 802.16p system, a method of assigning a dedicated ranging channel According to Table 2, if a UIUC value corresponds to 12, a corresponding IE specifies an IE configured to indicate a dedicated ranging channel for M2M devices. Yet, this is just an example only. The UIUC value specifying the IE configured to indicate the dedicated ranging channel for M2M devices may be set to a different value.

An M2M ranging allocation UL-MAP extended IE is used to indicate a case that an assigned ranging channel is used for an M2M device.

Table 3 shows an example of a format of the M2M ranging allocation UL-MAP extended IE.

TABLE 3

| Syntax | Size (bit) | Notes |
|---|---|---|
| M2M Ranging Allocation UL-MAP Extended IE( ){ | — | — |
|   Extended UIUC | 4 | M2M Ranging Allocation UL-MAP Extended = 0xB |
|   Length | 4 | Length is TBD |
|   OFDMA Symbol offset | 8 | — |
|   Subchannel offset | 7 | — |
|   No. OFDMA Symbols | 7 | — |
|   No. Subchannels | 7 | — |
|   Ranging Method | 2 | 0b00: Initial ranging/Handover Ranging over two symbols<br>0b01: Initial ranging/Handover Ranging over four symbols<br>0b10-0b11: reserved |
|   Dedicated ranging indicator | 1 | 0: The OFDMA region and ranging method defined are used for the purpose of normal ranging<br>1: The OFDMA region and ranging method defined are used for the purpose of ranging using dedicated CDMA code and transmission opportunities assigned in the MOB_PAG-ADV message |
|   M2M Dedicated Ranging Allocation Indicator | 1 | When this bit is set to 1, the ranging allocation defined by OFDMA UL-MAP IE format shall not be used by M2M devices |
| } | — | — |

Yet, similar to a legacy IEEE 802.16 system, if a dedicated ranging channel for M2M user equipments is assigned using a new UL-MAP extended IE (e.g., M2M ranging allocation UL-MAP extended IE), legacy user equipments are unable to read the new UL-MAP extended IE (e.g., M2M ranging allocation UL-MAP extended IE). Hence, a problem that the user equipments are unable to know a position to which a dedicated ranging channel is assigned may occur. In this case, a problem that the legacy user equipment reads a wrong UL burst may occur.

In order to solve the aforementioned problems, the present invention proposes a method of assigning an M2M device dedicated ranging channel in the following description. Specifically, in order to assign the M2M device dedicated ranging channel, a base station can provide an M2M device dedicated CID dedicatedly allocated to an M2M device and an M2M dedicated ranging allocation indicator to the M2M device.

2.1. M2M Device Dedicated CID Allocation

In order to solve the aforementioned problem, a CID capable of being known by all M2M devices is allocated in the present invention. In the following description, the CID can be called an M2M dedicated CID, an M2M specific CID, an M2M multicast CID for a dedicated ranging, an M2M dedicated ranging CID, an M2M CID, and the like. For clarity, the CID is commonly called an M2M dedicated CID in the following description. The M2M dedicated CID can be read by all user equipments having an M2M attribute. For instance, the user equipments having the M2M attribute can decode all MAP IEs transmitted via the M2M dedicated CID and use a resource allocated via the MAP IE. In the following description, a method of allocating the M2M dedicated CID to a user equipment or a method of informing the user equipment of the M2M dedicated CID is explained in detail. It is apparent that at least one of the methods explained in the following can be implemented in a manner of being combined with each other.

2.1.1. Fixedly Allocating in a System

Since an M2M dedicated CID is fixedly allocated in a system, both a user equipment and a base station may be aware of the M2M dedicated CID in advance. In this case, it is preferable to allocate a specific CID as the M2M dedicated CID in an actual CID allocation region and not to use the CID for a different purpose.

Table 4 shows an example that the M2M dedicated CID is fixedly allocated in a system.

TABLE 4

| CID | Value | Description |
|---|---|---|
| Ranging CID | 0x0000 | Used by SS and BS during ranging process. |
| Basic | 0x0001-m | The same value is assigned to both the DL and UL connection. |
| Primary Management | m + 1-2m | The same value is assigned to both the DL and UL connection. |
| Transport; Secondary Management | 2m + 1-0xFE9F | For the secondary management connection, the same value is assigned to both the DL and UL connection. |
| Multicast CIDs | 0xFEA0-0xFEFD | For the DL multicast service, the same value is assigned to all MSs on the same channel that participate in this connection. |
| M2M dedicated ranging CID | 0xFEFE | ABS supporting M2M application shall use this CID when allocating the M2M dedicated ranging region by using UL-MAP IE with UIUC set to 12. |

TABLE 4-continued

| CID | Value | Description |
|---|---|---|
| AAS Initial Ranging | 0xFEFF | ABS supporting AAS shall use this CID when allocating an AAS ranging period (using AAS Ranging Allocation IE). |
| ... | ... | ... |

Referring to Table 4, the M2M dedicated ranging CID has a value of '0xFEFE' and a base station supporting an M2M application may use the M2M dedicated CID when the base station allocates an M2M dedicated ranging region using UL-MAP IE in which a value of UIUC is set to 12.

Meanwhile, the M2M dedicated CID can be transmitted in a manner of being included in a MAP IE not only in a case that an M2M dedicated ranging channel capable of being used by all M2M devices within a cell is assigned but also in a case that a UL resource or a DL resource is allocated to all M2M devices within a cell only. For instance, when an M2M dedicated broadcast MAC message is transmitted, the M2M dedicated CID can be transmitted in a manner of being included in the MAP IE.

2.1.2. Allocating Using a Broadcast Message

A DL channel descriptor (DCD) message and a UL channel descriptor (UCD) message correspond to an MAC control message including a DL/UL channel parameter of a base station. The base station transmits the DL channel descriptor message and the UL channel descriptor message with a constant cycle in a broadcast form. The base station can allocate the M2M dedicated CID to M2M devices via such a broadcast MAC control message as the UCD or the DCD.

Figure 2:
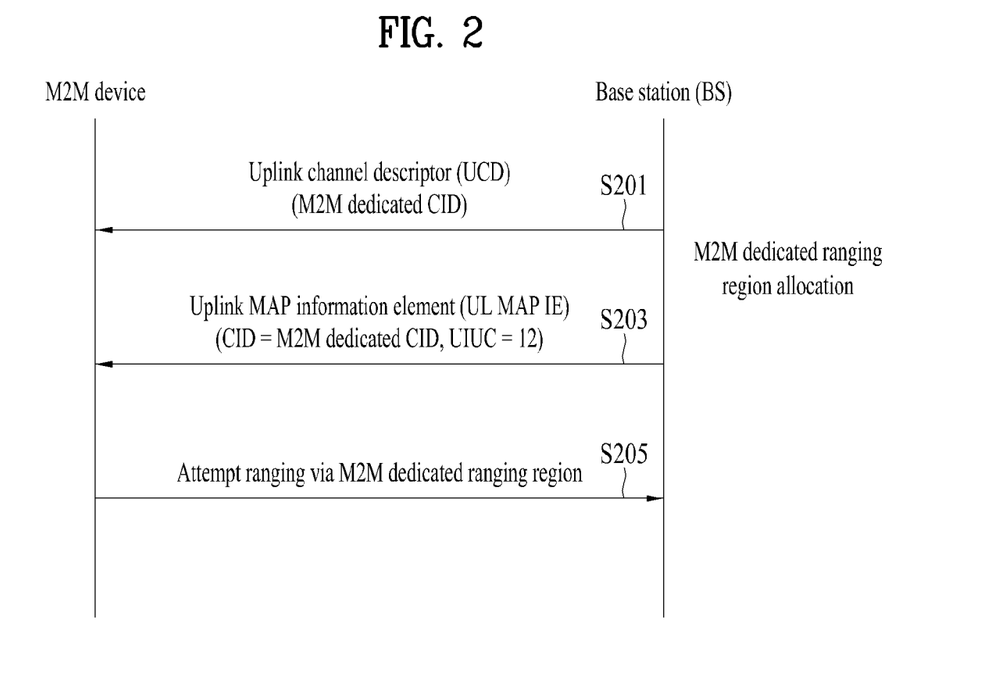
FIG. 2 is a flowchart for an example of a method of allocating an M2M dedicated CID according to one embodiment of the present invention.

FIG. 2 is a flowchart for an example of a method of allocating an M2M dedicated CID according to one embodiment of the present invention.

Referring to FIG. 2, a base station transmits a UCD, which is transmitted in a broadcast form, to a user equipment in a manner of including the M2M dedicated CID in the UCD [S201].

Table 5 indicates an example of a TLV parameter (type, length, and value) of an M2M dedicated CID.

TABLE 5

| Name | Type (1 byte) | Length | Value |
|---|---|---|---|
| M2M dedicated CID | 26 | 2 | This CID shall be used when allocating the M2M dedicated ranging region by using UL-MAP IE with UIUC set to 12 |

Referring to Table 5, the M2M dedicated CID can be used when an M2M dedicated ranging region is allocated using a UL-MAP IE in which a value of UIUC is set to 12. A TLV (type, length, and value) parameter of the M2M dedicated CID can be included in a broadcast message (e.g., a UCU or DCD message).

Having informed M2M devices of the M2M dedicated CID, a base station allocates an M2M device dedicated ranging region and transmits information on the M2M device dedicated ranging region to the M2M device via UL-MAP IE [S203]. In this case, the M2M dedicated CID is used in a CID field of the UL-MAP IE and a UIUC value of the UL-MAP IE can be set to 12. In particular, the M2M devices dedicated ranging region can be allocated using the M2M dedicated CID and the UL-MAP IE having the UIUC value set to 12.

The M2M device, which is allocated by the M2M device dedicated ranging region via the UL-MAP IE including the M2M dedicated CID from a base station, attempts a ranging via the allocated M2M device dedicated ranging region [S205].

2.1.3. Allocating in Case of an Initial Network Entry

In order for a base station to allocate an M2M dedicated CID to an M2M device, the base station can inform the M2M device of the M2M dedicated CID in a unicast form besides the method of informing in such a broadcast form as the aforementioned UCD. As an example, the base station can allocate the M2M dedicated CID to the M2M device by performing a registration process.

Figure 3:
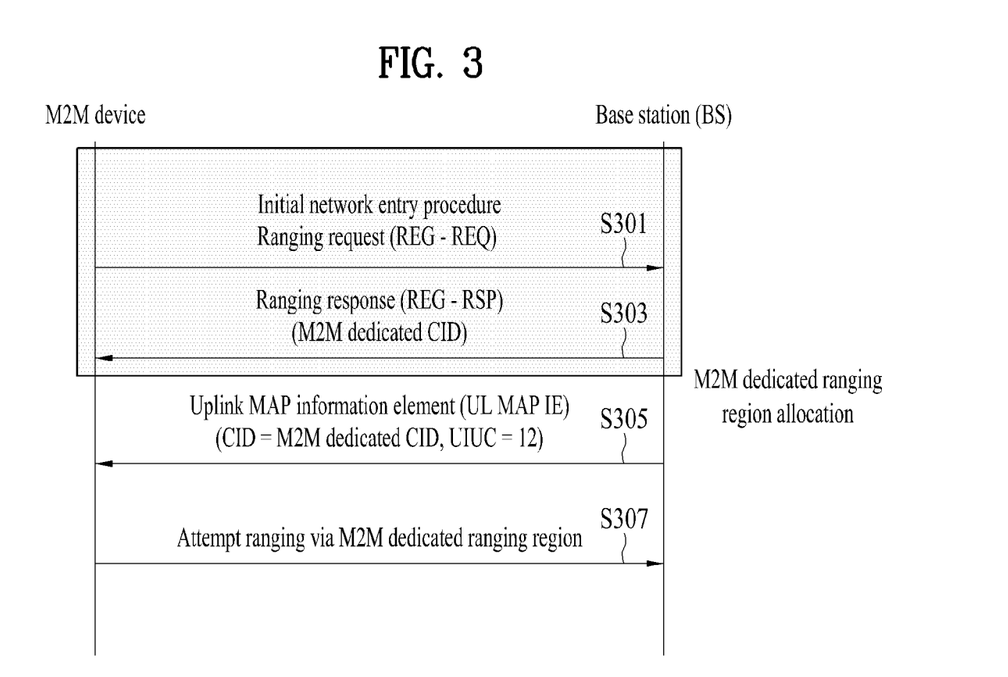
FIG. 3 is a flowchart for an example of a method of allocating an M2M dedicated CID according to one embodiment of the present invention.

FIG. 3 is a flowchart for an example of a method of allocating an M2M dedicated CID according to one embodiment of the present invention.

Referring to FIG. 3, in case of an initial network entry, an M2M device performs a registration procedure to register a base station in a manner of exchanging a registration request (REG-REQ) message and a registration response (REG-RSP) message with the base station [S301, S303]. In this case, the base station can inform the M2M device of the M2M dedicated CID in a manner of including the M2M dedicated CID in the REG-RSP message transmitted to the M2M device.

Table 6 indicates an example of a TLV parameter of the M2M dedicated CID.

TABLE 6

| Name | Type (1 byte) | Length | Value | Scope |
|---|---|---|---|---|
| M2M dedicated CID | 26 | 2 | This CID shall be used when allocating the M2M dedicated ranging region by using UL-MAP IE with UIUC set to 12 | REG-RSP |

Referring to Table 6, the M2M dedicated CID can be used when an M2M dedicated ranging region is allocated using a UL-MAP IE in which a value of UIUC is set to 12. A TLV parameter of the M2M dedicated CID can be included in a unicast message (e.g., REG-RSP message).

Having informed M2M devices of the M2M dedicated CID, a base station allocates an M2M device dedicated ranging region and transmits information on the M2M device dedicated ranging region to the M2M device via UL-MAP IE [S305]. In this case, the M2M dedicated CID is used in a CID field of the UL-MAP IE and a UIUC value of the UL-MAP IE can be set to 12. In particular, the M2M devices dedicated ranging region can be allocated using the M2M dedicated CID and the UL-MAP IE having the UIUC value set to 12.

The M2M device, which is allocated by the M2M device dedicated ranging region via the UL-MAP IE including the M2M dedicated CID from a base station, attempts a ranging via the allocated M2M device dedicated ranging region [S307].

2.1.4. Allocating in a De-registration Process

Figure 4:
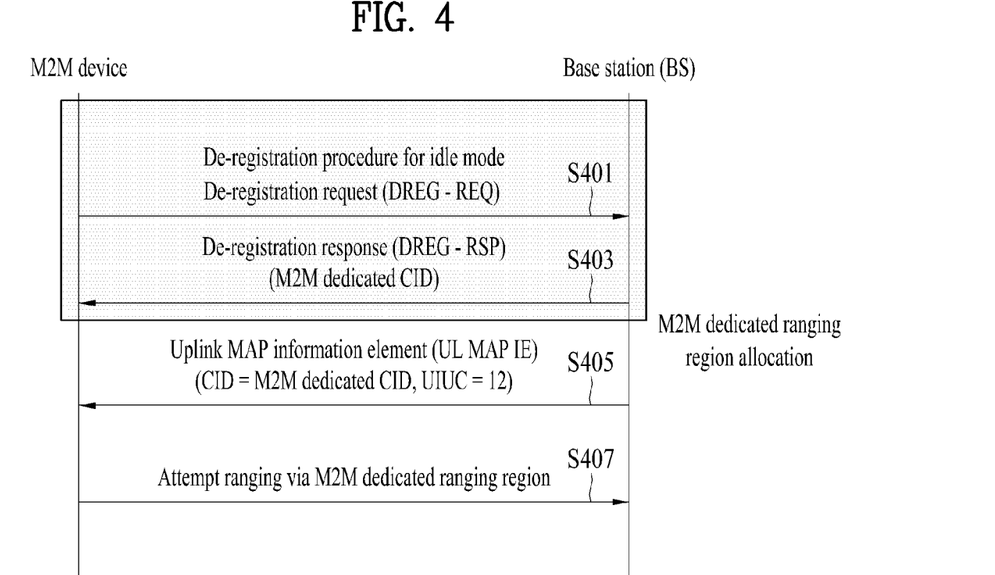
FIG. 4 is a flowchart for an example of a method of allocating an M2M dedicated CID according to one embodiment of the present invention.

FIG. 4 is a flowchart for an example of a method of allocating an M2M dedicated CID according to one embodiment of the present invention.

Referring to FIG. 4, in order for an M2M device to enter an idle mode state, the M2M device performs a de-registration procedure for an idle mode in a manner of exchanging a de-registration request (DREG-REQ) message and a de-registration response (DREG-RSP) message with a base station [S401, S403]. In this case, the base station can inform the M2M device of the M2M dedicated CID in a manner of including the M2M dedicated CID in the DREG-RSP message transmitted to the M2M device. An M2M ranging region is mainly used to prevent contention caused by a random access when a user equipment in an idle mode state performs a network reentry procedure. Hence, it is preferable to allocate the M2M dedicated CID when the user equipment performs a de-registration procedure with the base station.

Table 7 indicates an example of a TLV parameter of the M2M dedicated CID.

TABLE 7

| Name | Type (1 byte) | Length | Value | Scope |
|---|---|---|---|---|
| M2M dedicated CID | 26 | 2 | This CID shall be used when allocating the M2M dedicated ranging region by using UL-MAP IE with UIUC set to 12 | DREG-RSP |

Referring to Table 7, the M2M dedicated CID can be used when an M2M dedicated ranging region is allocated using a UL-MAP IE in which a value of UIUC is set to 12. A TLV parameter of the M2M dedicated CID can be included in a unicast message (e.g., REG-RSP message).

And, a base station can allocate an M2M dedicated ranging region according to an M2M group including at least one M2M device. An M2M group identifier (MGID) is allocated to each M2M group and the MGID uniquely identifies a specific M2M group in a network entity. In this case, as an example, the network entity may correspond to a base station. In this case, when a de-registration procedure is performed to indicate a corresponding ranging region related to a prescribed M2M group, the M2M dedicated CID can be informed to the M2M device. In particular, in the step S403, the base station can transmit the M2M dedicated CID allocated to a DREG-RSP message and the MGID corresponding to the M2M dedicated CID. In this case, one or more M2M dedicated CIDs can be allocated.

As mentioned in the foregoing description, if the M2M dedicated CID is transmitted to the user equipment together with the MGID, it is possible to allocate the M2M dedicated ranging region in an M2M group unit. In this case, one M2M dedicated ranging region can be used for one or more M2M groups.

Having informed M2M devices of the M2M dedicated CID, a base station allocates an M2M device dedicated ranging region and transmits information on the M2M device dedicated ranging region to the M2M device via UL-MAP IE [S405]. In this case, the M2M dedicated CID is used in a CID field of the UL-MAP IE and a UIUC value of the UL-MAP IE can be set to 12. In particular, the M2M devices dedicated ranging region can be allocated using the M2M dedicated CID and the UL-MAP IE having the UIUC value set to 12.

The M2M device, which is allocated to the M2M device dedicated ranging region via the UL-MAP IE including the M2M dedicated CID from a base station, attempts a ranging via the allocated M2M device dedicated ranging region [S407].

2.1.5. Allocating in a Service Generation Process

When a base station performs a DSA process to allocate a MGID together with an M2M device, the base station can inform the M2M device of an M2M dedicated CID.

Figure 5:
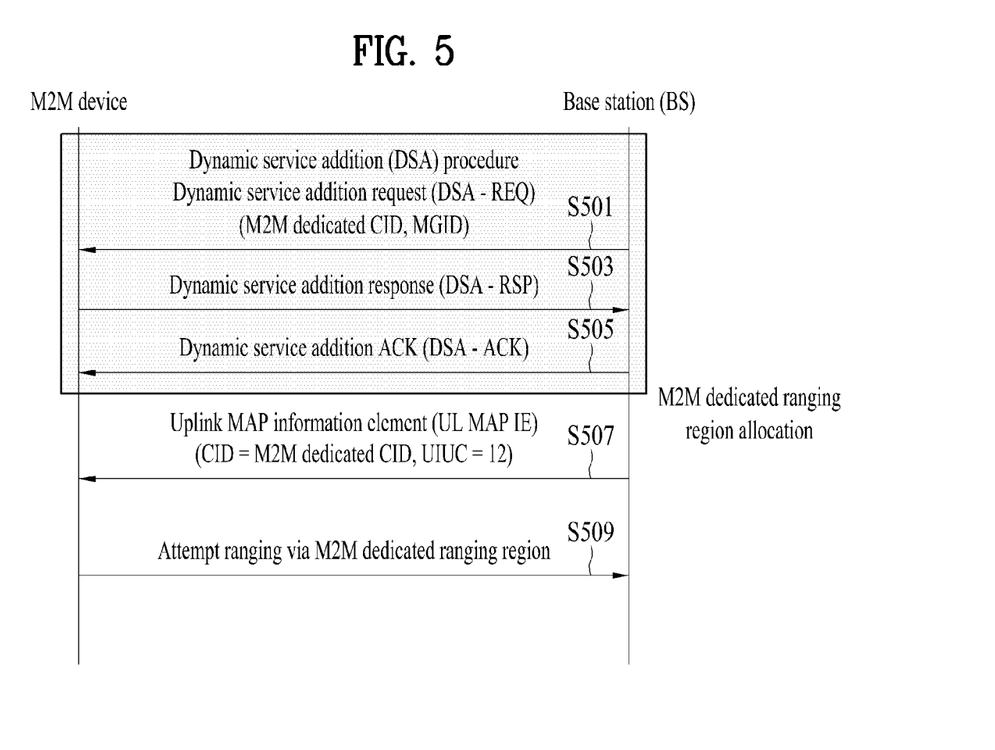
FIG. 5 is a flowchart for an example of a method of allocating an M2M dedicated CID according to one embodiment of the present invention.

FIG. 5 is a flowchart for an example of a method of allocating an M2M dedicated CID according to one embodiment of the present invention.

Referring to FIG. 5, having completed a registration procedure, a base station transmits a dynamic service addition request (DSA-REQ) message to an M2M device and the M2M device transmits a dynamic service addition response (DSA-RSP) message to the base station in response to the DSA-REQ message. In response to the DSA-RSP message, the base station transmits a dynamic service addition acknowledge (DSA-ACK) message to the M2M device. By doing so, the M2M device and the base station perform a procedure to configure a provisioned service flow in a network [S501, S503, and S505]. In this case, the base station can inform the M2M device of the M2M dedicated CID in a manner of including the M2M dedicated CID in the DSA-REQ message transmitted to the M2M device.

Meanwhile, since the embodiment according to FIG. 5 indicates a DSA (BS-initiated DSA) procedure initiated from the base station, the DSA-REQ message is transmitted to the M2M device in a manner of including the M2M dedicated CID. On the contrary, in a DSA (MS-initiated DSA) initiated from the M2M device, the M2M dedicated CID can be transmitted to the M2M device via the DSA-RSP message. In particular, when the DSA process allocating the MGID is performed, i.e., when a multicast connection is established, the M2M dedicated CID is transmitted to the M2M device in a manner of being included.

Table 8 indicates an example of a TLV parameter of the M2M dedicated CID.

TABLE 8

| Name | Type (1 byte) | Length | Value | Scope |
|---|---|---|---|---|
| M2M dedicated CID | 26 | 2 | This CID shall be used when allocating the M2M dedicated ranging region by using UL-MAP IE with UIUC set to 12 | DSA-REQ/RSP |

Referring to Table 8, the M2M dedicated CID can be used when an M2M dedicated ranging region is allocated using a UL-MAP IE in which a value of UIUC is set to 12. A TLV parameter of the M2M dedicated CID can be included in the DSA-REQ or the DSA-RSP message.

As mentioned in the foregoing description, if the M2M dedicated CID is transmitted to the user equipment via the DSA process, it is possible to allocate the M2M dedicated ranging region in an M2M group unit. In this case, one M2M dedicated ranging region can be used for one or more M2M groups.

Having informed M2M devices of the M2M dedicated CID, a base station allocates an M2M device dedicated ranging region and transmits information on the M2M device dedicated ranging region to the M2M device via UL-MAP IE [S507]. In this case, the M2M dedicated CID is used in a CID field of the UL-MAP IE and a UIUC value of the UL-MAP IE can be set to 12. In particular, the M2M devices dedicated ranging region can be allocated using the M2M dedicated CID and the UL-MAP IE having the UIUC value set to 12.

The M2M device, which is allocated by the M2M device dedicated ranging region via the UL-MAP IE including the M2M dedicated CID from a base station, attempts a ranging via the allocated M2M device dedicated ranging region [S509].

2.2. M2M Dedicated Ranging Allocation Indicator Transmission

As mentioned in the foregoing description, a ranging region can be allocated to an M2M device via a legacy OFDMA UL-MAP IE where a CID is set to a broadcast CID and UIUC is set to 12 (hereinafter 'legacy OFDMA UL-MAP IE). As shown in Table 3, a base station can indicate whether the M2M device uses an allocated region using the legacy OFDMA UL-MAP IE via an M2M dedicated ranging allocation indicator included in the M2M ranging allocation UL-MAP extended IE. In particular, if the M2M dedicated ranging region indicator transmitted from the base station is set to 1 (refer to Table 3), the M2M device does not use the ranging region allocated by the legacy OFDMA UL-MAP IE to perform a ranging.

Yet, if it is indicated whether the M2M device uses the ranging region allocated by the legacy OFDMA UL-MAP IE via the M2M dedicated ranging allocation indicator included in the M2M ranging allocation UL-MAP extended IE, a problem that the M2M device is unable to determine whether the M2M device uses the ranging region allocated using the legacy OFDMA UL-MAP IE occurs until the M2M device receives the M2M ranging allocation UL-MAP extended IE. Consequently, until the M2M dedicated ranging region is allocated and used, the M2M device preferentially receives an M2M dedicated ranging allocation indicator indicating whether the allocated ranging region is used using the legacy OFDMA UL-MAP IE from the base station. By doing so, the M2M device can determine whether the ranging region allocated by the legacy OFDMA UL-MAP IE is used.

Hence, in order for the M2M device to determine whether the ranging region allocated by the legacy OFDMA UL-MAP IE is used before the M2M dedicated ranging region is allocated, a method of receiving an M2M dedicated ranging region indicator in advance is required.

An example of a message transmitted by the base station in order for the M2M device to receive the M2M dedicated ranging region indicator in advance before the M2M dedicated ranging region is allocated may correspond to a UCD. This is because a user equipment should receive the UCD before a ranging is performed.

Table 9 indicates an example of a TLV parameter of the M2M dedicated ranging region indicator.

TABLE 9

| Name | Type (1 byte) | Length | Value |
|---|---|---|---|
| M2M Dedicated Ranging Region Indicator | x | 1 | Bit 0, When this bit is set to 1, the ranging allocation defined by OFDMA UL-MAP IE format with UIUC = 12 and broadcast CID shall not be used by M2M devices Bits 1-7: Reserved |

Referring to Table 9, if bit 0 of the TLV of the M2M dedicated ranging region indicator, which is included in the UCD received from the base station, is set to 1, the M2M devices does not use the ranging region allocated by the UL-MAP IE, which is configured by a UIUC value of 12 and a broadcast CID.

And, the base station can inform the M2M device of an indicator indicating whether a ranging region allocated using the legacy OFDMA UL-MAP IE (CID=broadcast CID, UIUC=12) is used via a paging message.

Table 10 indicates an example of a TLV parameter of the M2M dedicated ranging region indicator.

TABLE 10

| Name | Type (1 byte) | Length | Value |
|---|---|---|---|
| M2M Dedicated Ranging Region Indicator | x | 1 | Bit 0, When this bit is set to 1, the ranging allocation defined by OFDMA UL-MAP IE format with UIUC = 12 and broadcast CID shall not be used by M2M devices Bits 1-7: Reserved |

Referring to Table 10, if bit 0 of the TLV of the M2M dedicated ranging region indicator, which is included in a paging message received from the base station, is set to 1, the M2M devices does not use the ranging region allocated by the UL-MAP IE, which is configured by a UIUC value of 12 and a broadcast CID.

3. Generals of Device to which the Present Invention is Applicable

Figure 6:
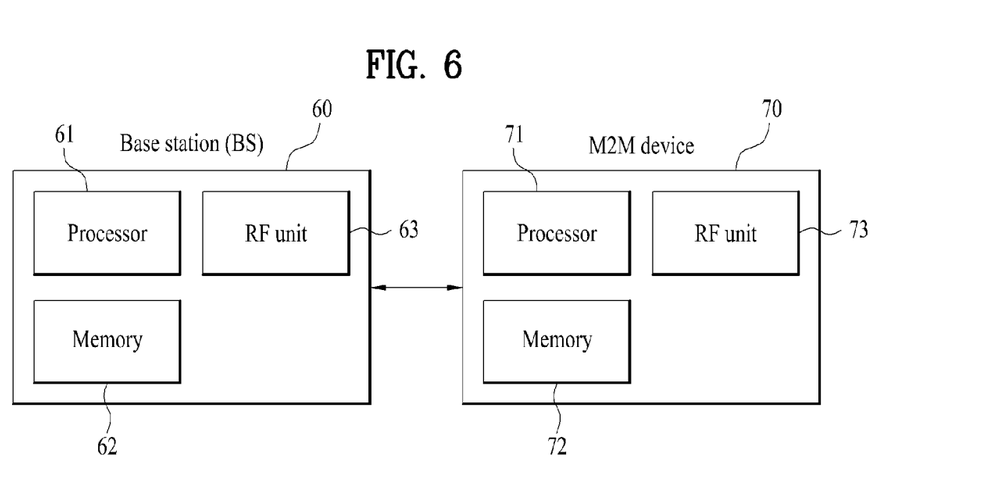
FIG. 6 is a block diagram for an example of a wireless communication device according to one embodiment of the present invention.

FIG. 6 is a block diagram for an example of a wireless communication device according to one embodiment of the present invention.

Referring to FIG. 6, a wireless communication system includes a base station 60 and a plurality of M2M devices 70 situating in a region of the base station 60. Although FIG. 6 shows an example of communication performed between the base station 60 and the M2M device 70, an M2M communication method according to the present invention may be applied to a communication performed between M2M devices as well. Each of the devices can perform methods according to various embodiments explained in the foregoing description with a form identical to a device configuration depicted in FIG. 6.

A base station 60 includes a processor 61, a memory 62, and an RF (radio frequency) unit 63. The processor 61 implements the proposed functions, processes and/or methods. Layers of a radio interface protocol can be implemented by the processor 61. The memory 62 is connected to the processor 61 and stores various informations to drive the processor 61. The RF unit 63 is connected to the processor 61 and transmits and/or receives a radio signal.

An M2M device 70 includes a processor 71, a memory 72, and an RF (radio frequency) unit 73. The processor 71 implements the proposed functions, processes and/or methods. Layers of a radio interface protocol can be implemented by the processor 71. The memory 72 is connected to the processor 71 and stores various informations to drive the processor 71. The RF unit 73 is connected to the processor 71 and transmits and/or receives a radio signal.

The memory 62/72 may be positioned inside or outside of the processor 61/71 and can be connected with the processor 61/71 by a well-known means. And, the base station 60 and/or the M2M device 70 may include a single antenna or multiple antennas.

Meanwhile, although it is not depicted in FIG. 6, the M2M device 70 can include various additional configurations according to a type of application of the M2M device. If the M2M device is used for a smart meter, the M2M device 70 can include an additional configuration for a power measurement.

An operation of the power measurement can be controlled by the processor 71 depicted in FIG. 6 or a separately configured processor (not depicted).

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of assigning a ranging channel in a wireless communication system of the present invention is explained centering on an example applied to IEEE 802 system, the method can be applied to various wireless communication systems as well as the IEEE 802 system.

What is claimed is:

1. A method of assigning a ranging channel in a wireless communication system supporting a machine to machine communication, the method comprising:
    transmitting a message including a dedicated connection identifier (CID) dedicatedly allocated to a device supporting the machine to machine communication;
    allocating a dedicated ranging region to the device supporting the machine to machine communication to transmit a ranging request message; and
    transmitting an uplink MAP (UL-MAP) message including information on the dedicated CID and the dedicated ranging region to the device supporting the machine to machine communication.

2. The method of claim 1, wherein the message including the dedicated CID corresponds to an uplink channel descriptor message or a downlink channel descriptor message.

3. The method of claim 1, wherein the message including the dedicated CID corresponds to a registration response message.

4. The method of claim 1, wherein the message including the dedicated CID corresponds to a de-registration response message.

5. The method of claim 1, wherein the message including the dedicated CID corresponds to a dynamic service addition request message or a dynamic service addition response message.

6. The method of claim 1, wherein the dedicated ranging region is differently allocated according to a group including one or more devices supporting the machine to machine communication.

7. The method of claim 1, further comprising transmitting a message including a dedicated ranging region indicator,
    wherein the dedicated ranging region indicator indicates whether the device supporting the machine to machine communication uses a ranging region allocated by the UL-MAP message including a broadcast CID.

8. A base station assigning a ranging channel in a wireless communication system supporting a machine to machine communication, the base station comprising:
    an RF (radio frequency) unit configured to transceive a radio signal; and
    a processor configured to transmit a message including a dedicated connection identifier (CID) dedicatedly allocated to a device supporting the machine to machine communication, the processor configured to allocate a dedicated ranging region to the device supporting the machine to machine communication to transmit a ranging request message, and the processor configured to transmit an uplink MAP (UL-MAP) message including information on the dedicated CID and the dedicated ranging region to the device supporting the machine to machine communication.

9. The base station of claim 8, wherein the message including the dedicated CID corresponds to an uplink channel descriptor message or a downlink channel descriptor message.

10. The base station of claim 8, wherein the message including the dedicated CID corresponds to a registration response message.

11. The base station of claim 8, wherein the message including the dedicated CID corresponds to a de-registration response message.

12. The base station of claim 8, wherein the message including the dedicated CID corresponds to a dynamic service addition request message or a dynamic service addition response message.

13. The base station of claim 8, wherein the dedicated ranging region is differently allocated according to a group including one or more devices supporting the machine to machine communication.

14. The base station of claim 8, further comprising transmitting a message including a dedicated ranging region indicator,
    wherein the dedicated ranging region indicator indicates whether the device supporting the machine to machine communication uses a ranging region allocated by the UL-MAP message including a broadcast CID.

* * * * *